US 6,708,922 B1

(12) United States Patent
Hamilton (10) Patent No.: US 6,708,922 B1
(45) Date of Patent: Mar. 23, 2004

(54) AIRSHIP

(75) Inventor: Jonathan Hamilton, Sandton (ZA)

(73) Assignee: Cherokee Ltd., Douglas Isle of Man (GB)

( * ) Notice: Subject to any disclaimer, the term of this patent is extended or adjusted under 35 U.S.C. 154(b) by 0 days.

(21) Appl. No.: 08/869,811

(22) Filed: Jun. 5, 1997

(30) Foreign Application Priority Data

Jun. 10, 1996 (ZA) ............................................. 96/4927

(51) Int. Cl.⁷ ................................................. B64B 1/08
(52) U.S. Cl. ........................................ 244/30; 244/125
(58) Field of Search ............................. 244/30, 96, 97, 244/125–128

(56) References Cited

U.S. PATENT DOCUMENTS

| | | | | | |
|---|---|---|---|---|---|
| 1,298,487 A | * | 3/1919 | Flower | ...................... | 244/125 |
| 1,311,237 A | * | 7/1919 | Laisy | ...................... | 244/125 |
| 1,544,431 A | * | 6/1925 | Broyles | .................... | 244/127 |
| 1,594,073 A | * | 7/1926 | Short | ........................ | 244/30 |
| 1,641,323 A | * | 9/1927 | D'Humy | .................. | 244/125 |
| 1,811,122 A | * | 6/1931 | Geisler et al. | ............. | 244/125 |
| 1,824,453 A | * | 9/1931 | Warth | ........................ | 244/125 |
| 2,073,297 A | * | 3/1937 | Durr | .......................... | 244/125 |
| 5,348,251 A | * | 9/1994 | Ferguson | .................. | 244/30 |

FOREIGN PATENT DOCUMENTS

| | | | | |
|---|---|---|---|---|
| DE | 231266 | * | 10/1908 | ................ 244/125 |
| GB | 110812 | * | 11/1917 | ................ 244/125 |

* cited by examiner

Primary Examiner—Galen L. Barefoot
(74) Attorney, Agent, or Firm—Ladas & Parry (57) ABSTRACT

A modular unit 129 for forming an airship 100 includes an elongate spine 106 intended to extend along a longitudinal axis of the airship 100. The spine 106 includes a number of interconnecting elements 108 each of which has connection means 182 for being joined in end to end relationship with an interconnecting element 108 of an adjacent modular unit 129. Buoyant support means in the form of gas bags 105 are fixed relative to the spine and are positioned within annular spaces 132 and 134. The invention also extends to an airship 100 which may be formed from a number of modular units 129 connected end to end and with a central spine 106 extending between outer extremities 116 and 118. A gondola 101 is located within a lower half of annular space 102 such that an outwardly facing surface is flush with an outer surface of the airship 100.

9 Claims, 8 Drawing Sheets

AIRSHIP

THIS INVENTION relates to an airship. It relates also to a modular unit for forming an airship.

According to a first aspect of the invention there is provided, a modular unit for forming an airship, the modular unit including an elongate spine intended to extend along a longitudinal axis of the airship, the spine including at least one interconnecting element having connection means for joining it in end to end relationship with an interconnecting element of an adjacent modular unit; and buoyant support means fixed relative to the spine for providing buoyant support to the airship, in flight.

The buoyant support means may be in the form of at least one gas bag. The gas bag may be filled with helium for displacement of air, which provides the buoyant support for the airship. Typically, the unit may include a frame assembly for supporting the bag around the spine.

In one embodiment of the invention, the frame assembly may include at least one support ring which is positioned in radially spaced relationship relative to the spine intermediate leading and trailing extremities of the spine thereby defining an annular space between the spine and the ring into which the gas bag is received.

The frame assembly may further include a plurality of elongate locating members which are fixed at circumferentially spaced positions to the ring and which extend inwardly from the ring towards the spine. Thus, the locating members serve fixedly to position the ring relative to the spine.

The locating members may extend bicycle-spoke fashion between the ring and the leading and trailing extremities of the spine thereby defining a pair of back to back frusto-conical spaces around the spine for receiving the gas bag. The locating members may be in the form of flexible strands and may be connected in tension between the ring and the spine.

The unit may further include tension relaxing means for relaxing over-tensioning of the flexible strands induced by relative limited movement of adjacent interconnected elements when the airship is in flight.

In particular, inner ends of the flexible locating members may be fixed to a pair of spaced inner rings located in close proximity to the spine at leading and trailing extremities thereof. The inner rings may then be slidable longitudinally relative to the spine and may each have biassing springs connectable to similar inner rings of an adjacent modular unit thereby to bias the inner rings in opposite directions to form the tension relaxing means.

In another embodiment of the invention, the locating members may be rigid and may extend radially outwardly from the spine thereby dividing the unit in a circumferential direction into a number of segments.

A plurality of gas bags may be secured to the rigid locating members and may, once filled occupy each of the segments. In one embodiment, each modular unit may include four locating members circumferentially spaced at 90° to one another and dividing the unit into quadrants, each quadrant being occupied by a bag.

At least one of the rigid locating members may include a plurality of struts extending outwardly from the rectangular support and defining a cage-like housing for receiving one of the gas bags. Accordingly, in addition to the bags which occupy the quadrants between successive locating members, further bags may be provided formed within the housing of one or more of the rigid locating members. Typically, when the modular unit is divided into quadrants by four rigid locating members, an upwardly and downwardly extending locating member may define first and second housings for receiving a bag, in addition to the four bags provided in each of the quadrants.

In another embodiment, the gas bags may be located within the frusto conical spaces referred to above and/or in the space outside of the frusto-conical spaces.

The upwardly extending first housing may have a flat upper surface which when each of the modular units of the mid-section are joined together, is aligned with corresponding flat upper surfaces of adjacent mid-sections, thereby providing a walkway along a top portion of the airship.

The spine may define an inner longitudinally extending passage which extends along the length of the spine. In one embodiment, the spine may include a plurality of struts joined together to form a box-like rectangular support extending along the longitudinal axis. The struts may be joined together to form a box-like support of triangular or similar cross-section. In another embodiment, the spine may be generally circular cylindrical in shape defining a circular passage along its length.

The invention extends also to an airship which includes
   a central spine extending along a longitudinal axis of the airship for providing rigidity to the airship;
   a frame assembly attached to and surrounding the spine; and
   buoyant support means fixed relative to the spine for providing buoyant support to the airship, in flight.

The airship may be formed from a plurality of modular units as above described.

The modular units may be cylindrical in cross-section. In one embodiment, a mid-section of the airship may be cylindrical and may include a plurality of cylindrical modular units which are interconnected end to end. Similarly, nose and tail sections of the airship may include a plurality of cylindrical modular units connected end to end with the cross-sectional area of each unit decreasing from each of the ends of the cylindrical mid-section to the outer extremities of the nose and tail sections, respectively. Instead, the nose and tail sections may each comprise a single modular unit.

The overall shape of the airship may also be elliptical in side elevation.

Each of the modular units may be connected to an adjacent modular unit by connection means. More particularly, ends of each of the spines may be fastened together, for example, by means of nuts and bolts.

The airship may further include a gondola having releasable attachment means for releasably attaching the gondola to the airship.

In one embodiment, when the frame assembly defines the annular space, the gondola may be received within at least a portion of the annular space defined around the spine. The gondola may have an arcuately shaped outer surface which is flush with an outer surface of the airship.

In another embodiment, the downwardly extending second housing may include a lower flat surface which when each of the modular units of the mid-section are joined together, is aligned with corresponding flat lower surfaces of adjacent mid-sections for providing an area of attachment for a roof section of the gondola. In another embodiment, each modular unit of the mid-section may include a portion of the gondola attached to its lower flat surface, an end of each portion of the gondola then being secured to an abutting end of a portion of the gondola of an adjacent modular unit. The gondola may thus be formed from a plurality of modular gondola units capable of being joined in end to end relationship.

The bag may be of any suitable lightweight material, for example, parachute silk or material sold under the trade name Tedlar or Ripstop. The struts and locating members may be made of any suitable lightweight structural material, for example, aluminium. The spine may be made of any resilient lightweight material, for example, carbon fibre composite material.

Each of the bags may be secured together in any suitable manner. More particularly, each bag may be secured adhesively to an adjacent bag, for example, by means of adhesive means sold under the trade name Velcro and may be fastened to one or more of the struts by means of, for example, rubber grommets. More particularly, each of the bags may include an extended seam portion defining a plurality of apertures along a length thereof and may then be fastened, for example, by means of the rubber grommets along a length of an adjacent strut. When the locating members are in the form of flexible strands, the bags may be fixed relative to the spine by being secured to the spine and/or the rings.

The airship may have a flexible outer skin which at least partially surrounds the interconnecting modular units, thereby providing a continuous exterior surface which may be used for placing advertisements and the like on the airship.

The airship may be mechanically driven. More particularly, the airship may be provided with at least one engine or electric motor for driving one or more propellers situated toward the outer extremity of the tail section. When the airship has an engine one or more of the modular units may be provided with fuel storage tanks. The propellers may direct air over a ruddervator to permit moving of the airship vertically and horizontally even while the airship is not moving or is travelling at low speeds.

In another embodiment, the airship may be externally driven. In particular, it may have attachment means for attaching it to a ground vehicle, for example, by means of a cable.

The airship may include control means for controlling the direction of flight of the airship. In particular, the control means may be in the form of one or more rudders provided on the tail section. The airship may also include tanks for containing ballast, e.g. water and compressed air, and release means for releasing the ballast thereby to permit control of the elevation of the airship.

The airship may be provided with instrumentation, fuel lines and the like which pass through more than one modular unit. Accordingly, each modular unit may be fitted with sections of the instrumentation, fuel lines and the like for connecting to corresponding sections on adjacent modular units.

The spine may define an air tight conduit for receiving compressed air. The spine may also be provided with air release ports for releasing the air from the conduit thereby to permit the direction of movement of the airship to be controlled.

The invention will now be described, by way of example, with reference to the accompanying diagrammatic drawings.

Figure 1:
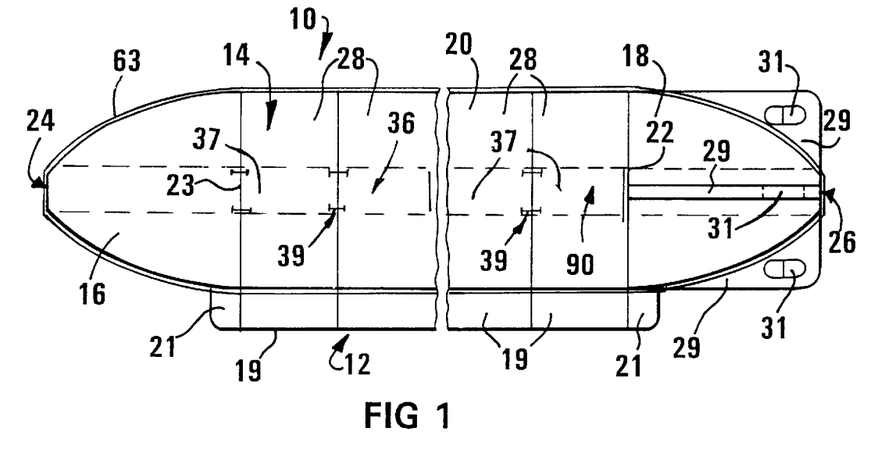
FIG. 1 represents a side view of one embodiment of an airship in accordance with the invention with certain details having being omitted for clarity.

In FIG. 1 of the drawings, reference numeral 10 generally designates an airship in accordance with the invention.

The airship 10 includes a gondola 12 which is connected to a support structure 14, and buoyant support means (not shown in FIG. 1 but described below with reference to FIGS. 2 and 3) for providing buoyant support to the airship 10, in flight.

The support structure 14 is elongate and generally circular in cross-section and includes a nose section 16, a tail section 18 and a mid-section 20 provided between the nose section 16 and tail sections 18. Each of the nose and tail sections 16 and 18 has a decreasing cross sectional area from ends 22 and 23 of the mid-section 20 to outer extremities 24 and 26 of the nose and tail sections 16 and 18, respectively.

The mid-section 20 includes a plurality of cylindrical modular units 28 (described in more detail in FIGS. 2 and 3 below) which are interconnected end to end. The nose and tail section 16 and 18 each comprise a singular modular unit which are connected to the ends 22 and 23, respectively. Each of the cylindrical modular units 28 is attached to a gondola portion 19. Each gondola portion 19, is secured to an adjacent gondola portion 19. The nose and tail sections 16 and 18 are provided with end gondola portions 21 which close off the ends of the gondola units 19. In another embodiment, the gondola 12 may be in the form of a single gondola unit spanning the length of the mid-section 20.

The tail section 18 includes four stabilizing fins 29 (only three shown in FIG. 1) extending radially outwardly from a longitudinal axis of the airship. The fins 29 have rudders 31 towards their trailing ends for controlling the direction of movement of the airship 10.

In the embodiment illustrated, the airship 10 further includes connection means (not shown) for connecting it to a ground vehicle which pulls the airship along at a desired speed and in a desired direction. The airship 10 can thus fly at low altitudes relative to ground level and can be used for pleasure flights, game viewing, and the like.

The modular unit 28 (shown in FIG. 2) includes a frame assembly 30. The frame assembly 30 includes a plurality of struts 34 joined together to form a box-like rectangular spine 36 extending along a longitudinal axis of the modular unit 28. The spine 36 is made up of a plurality of interconnecting elements 37 (as shown in FIG. 1) which are connected together by connection means in the form of nuts and bolts indicated by reference numeral 39 and not shown in detail. It is to be appreciated that the interconnecting elements may instead be welded or bonded together. The spine 36 also defines an inner longitudinally extending passage 90.

Figure 2:
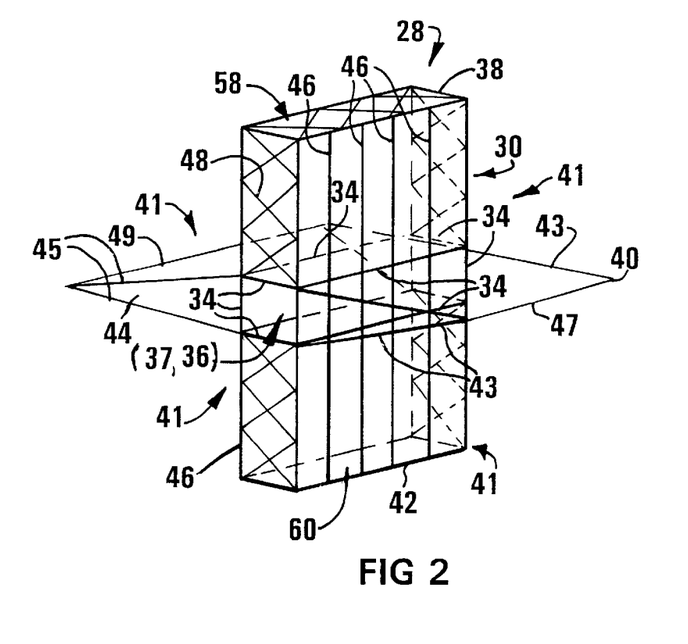
FIG. 2 represents a three dimensional view of a frame assembly of a modular unit used in the airship of FIG. 1.

The modular unit 28 includes four locating members 38, 40, 42 and 44 of which extend generally radially outwardly from the rectangular spine 36 and are spaced at 90° to one another thereby dividing the modular unit 28 into quadrants 41.

The upper locating member 38 includes a plurality of vertically extending struts 46 and cross struts 48 which extend in zig-zag fashion upwardly from the support 36 and over the top of the locating member 38 thereby defining a rectangular cage-like housing for receiving buoyant support means in the form of a gas bag 50 (shown in FIG. 3) which, when filled, includes flat rectangular sides which bear against the inner struts of the housing. The lower locating member 42 includes a similar cage-like housing extending downwardly from the spine 36 for receiving a gas bag 52 similar to the gas bag 50.

Each of the locating members 40 and 44 include outwardly extending pairs of side struts 43 and 45 which converge towards their radially outer ends, each of the ends being joined together by cross-struts 47 and 49. The laterally extending locating members 40 and 44 are generally wedge-shaped and extend substantially horizontally from the spine 36.

Figure 3:
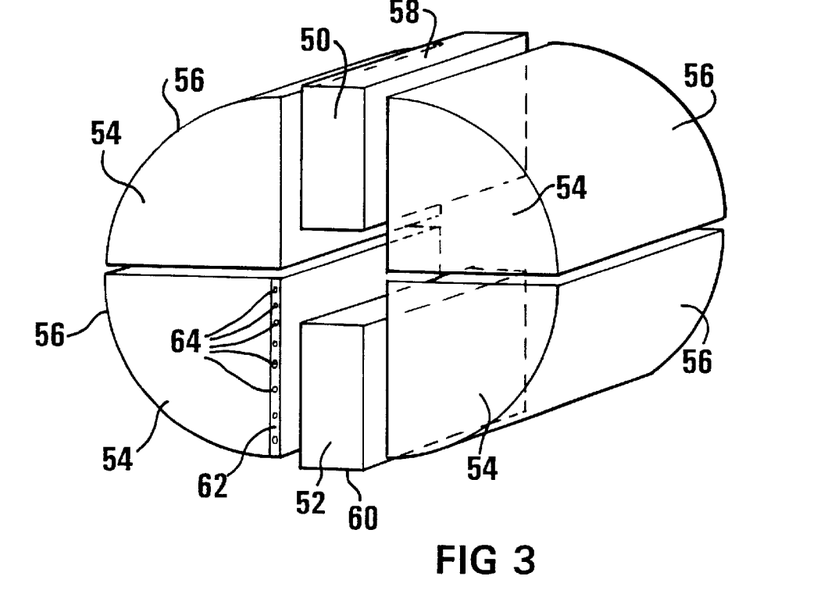
FIG. 3 represents a three-dimensional view of a plurality of gas bags which are connectable to the frame assembly of FIG. 2.

As shown in FIG. 3, four further bags 54, in addition to the bags 50 and 52, are provided in each of the respective quadrants 41. Each of the bags 54 has a curved circumferentially extending outer surface 56 which together with a flat upper surface 58 and a flat lower surface 60 of the locating members 38 and 42 provide the generally circular cross-sectional shape of the modular unit 28. The modular unit 28 of FIG. 2 has been omitted from FIG. 3 for ease of illustration.

Each of the bags 50, 52 and 54 is secured to an adjacent strut by means of an extended seam portion 62 (only one shown on one of the bags 54 for the sake of clarity). The seam portion 62 defines a plurality of apertures 64 at spaced intervals along its length for securing the bag 54 to one of the vertically extending struts 46 by means of, for example, rubber grommets.

Typically, the bags 50, 52 and 54 are made from material solid under the tradename Tedlar or Ripstop and are coated with a material sold under the tradename Hypelon.

The airship 10 also includes an outer skin 63 (see FIG. 1) which surrounds the support structure 14 of the bags 50, 52 and 54 thereby providing a continuous exterior surface which can be used for placing advertisements and the like on the airship 10. The outer skin 63 is typically made as a multilayered laminate of polyester and material sold under the tradename Ripstop or Tedlar.

Figure 4:
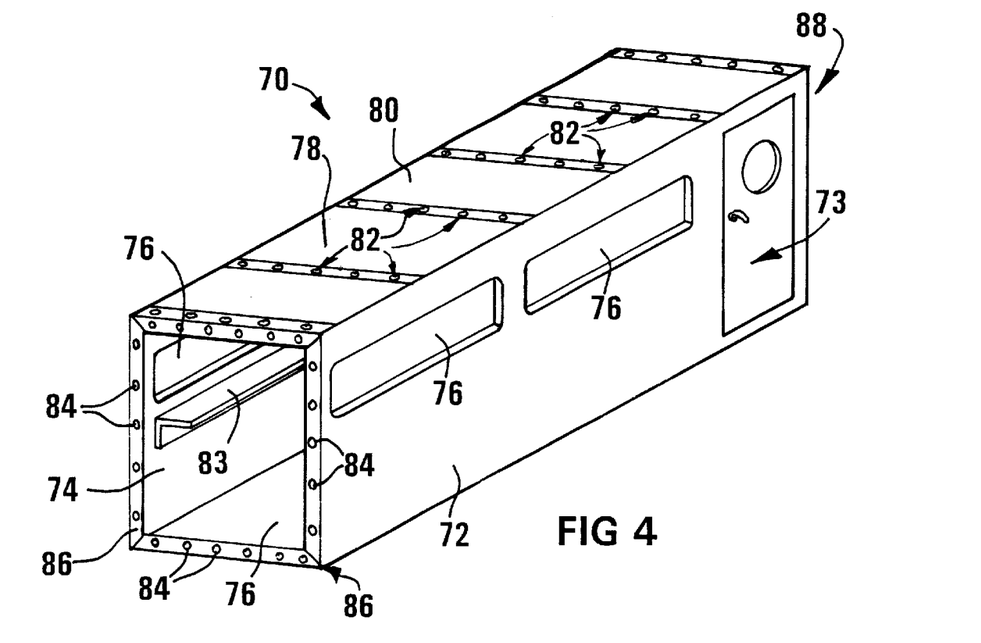
FIG. 4 represents a three dimensional view of a portion of a gondola of the airship of FIG. 1.

In FIG. 4 of the drawings, one form of a modular gondola unit 70 for the airship 10 is shown.

The gondola unit 70 is generally elongate in shape and has rectangular sidewalls 72 and 74, interconnected by a floor section 76 and a roof section 78. An outer face 80 of the roof section 78 is rectangular in shape and abuts against a complementary underside of the gondola unit 70 formed by the lower flat surfaces 60 of the modular units 28.

The outer face 80 includes a plurality of aligned sets of apertures 82 spaced along a length of the roof section 78 for receiving fasteners, for example, nuts and bolts, for fastening the gondola unit 70 to the support structure 14.

Each of the sidewalls 72 and 74 define viewing apertures 76 towards their upper ends and include shelves 83 for providing support for refreshments and the like. The side wall 72 is provided with an access opening 73. The gondola unit 70 further defines a plurality of apertures 84 spaced along the perimeter of edges 86 and 88 for securing the gondola unit 70, for example, with nuts and bolts, to similar gondola units 70. End gondola units may be integral with the nose and tail sections 16 and 18 as shown by reference numeral 21 in FIG. 1.

Figure 5:
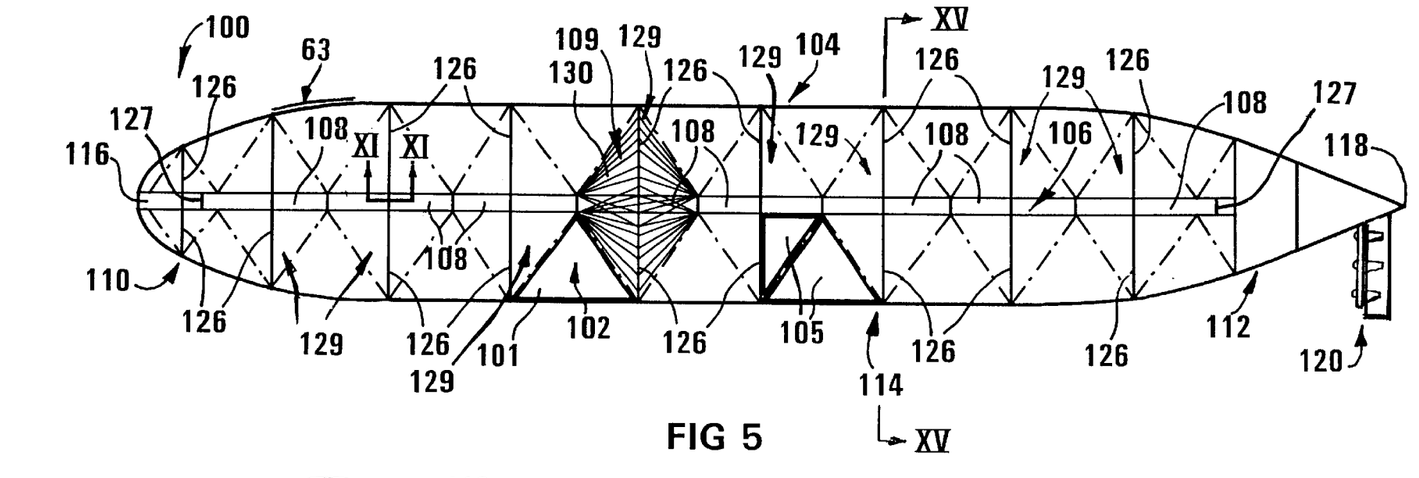
FIG. 5 represents a side view of another embodiment of an airship in accordance with the invention with certain details having being omitted for clarity.

In FIG. 5 of the drawings, reference numeral 100 generally designates another embodiment of an airship in accordance with the invention.

The airship 100 includes a gondola 101 which instead of being suspended beneath the airship 100, is positioned within the airship 100 at a position shown generally by reference numeral 102. The details of the gondola 101 and its attachment to the airship 100 have been omitted from FIG. 5 for the sake of clarity and are described in more detail below with reference to FIGS. 15 to 18 of the drawings.

The airship 100 is formed from a plurality of modular units 129 which form an elongate support structure generally represented by reference numeral 104 and which is attached to the gondola 101 as described in more detail below. The support structure 104 includes a spine generally indicated by reference numeral 106. The spine 106 comprises a plurality of interconnecting elements 108 which are connected in end to end relationship along a longitudinal axis of the airship 100 as is described in more detail below.

The airship 100 is also provided with buoyant support means in the form of a plurality of gas bags 105 (of which only two are shown in FIG. 5) which are positioned within the airship 100 and which are secured to the elongate support structure 104. The airship 100 further includes a frame assembly 109 (described in more detail below) for supporting the gas bags 105 around the spine 106.

The support structure 104 includes a nose section 110, a tail section 112 and a mid-section 114 which is provided between the nose and the tail sections 110, 112. The mid-section 114 is substantially circular cylindrical in cross section with the nose and tail sections 112 and 114 having a decreasing circular cross sectional area from each end of the mid-section 114 to outer extremities 116 and 118 of the nose and tail sections 110, 112, respectively. The plurality of interconnecting elements 108 forming the spine 106 extend along the longitudinal axis between the outer extremities 116 and 118.

Figure 6:
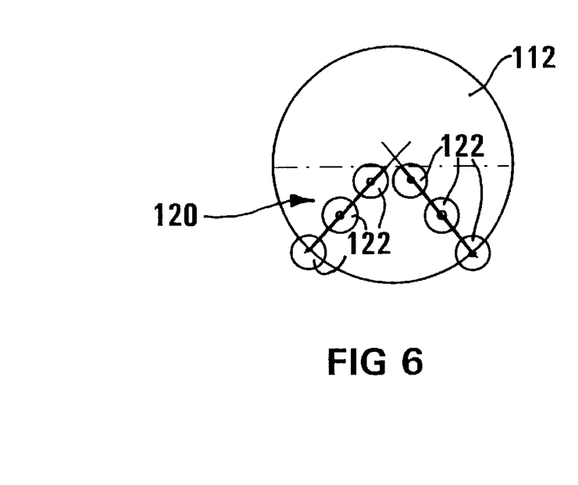
FIG. 6 represents a rear end view of the airship of FIG. 5.

As is shown more clearly in FIG. 6 of the drawings, the airship 100 is provided with a stabilizing fin arrangement 120 towards a trailing end of the tail section 112. The fin arrangement 120 is in the form of an inverted V as seen from the outer extremity 118. It is to be appreciated that, the fin arrangement 120 could be any suitable fin arrangement. For example, an inverted Y-formation or a cruciform formation could be used. Three mechanically driven propellers 122 are provided on each side of the fin arrangement 120. Typically, the propellers are driven by fuel injected V-8 engines. The propellers serve to direct air over the fin arrangement 120 in a desired direction thereby to enhance the manoeuvrability of the airship 100. The fin arrangement 120 serves as a ruddervator to permit vertical and horizontal movement even while the airship 100 is not moving or is travelling at low speed.

Referring now to FIGS. 5, 7, 8 and 9 of the drawings, the frame assembly 109 includes a plurality of longitudinally spaced support rings 126 which are positioned around the spine 106 along the length of the airship 100 between the outer extremities 116 and 118.

Figure 7:
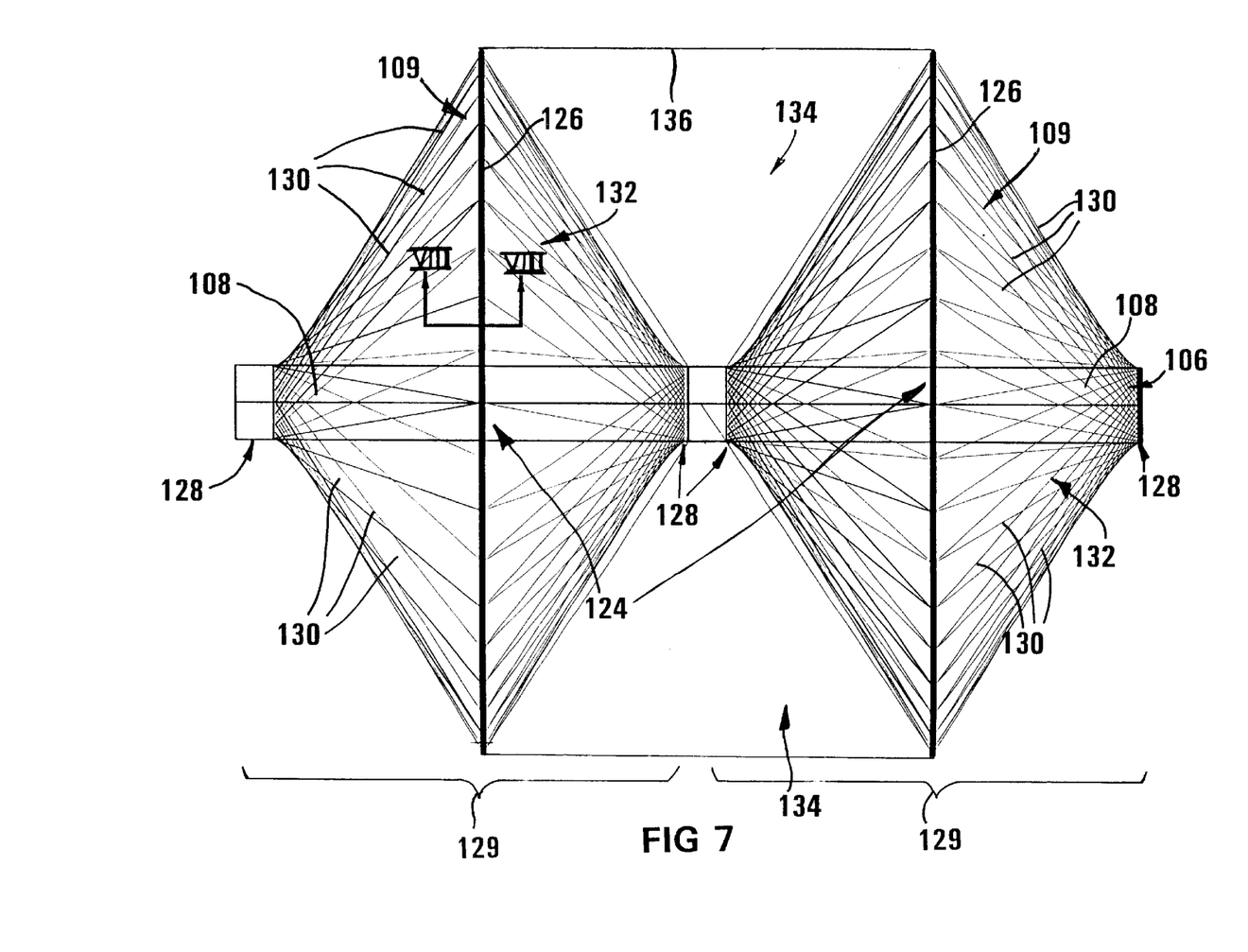
FIG. 7 represents a side view of a portion of a frame assembly of the airship of FIG. 5 showing two adjacent interconnected modular units.

In FIG. 7 of the drawings, two adjacent interconnecting elements 108, which make up only a portion of the spine 106, are shown in detail. Each of the interconnecting elements 108 is generally elongate and has a mid-section generally represented by reference numeral 124 and outer extremities 128. Each ring 126 is positioned centrally around an associated interconnecting element 108 intermediate the outer extremities 128. The elements 108 are interconnected in abutting end to end relationship as is indicated in more detail in FIGS. 11, 12 and 13 of the drawings.

The frame assembly 109 further includes a plurality of locating members 130 which are fixed at circumferentially spaced positions to the rings 126 and which extend inwardly, bicycle-spoke fashion, between each ring 126 and the outer extremities 128 of each associated interconnecting element 108. Thus, an annular space 132 which is generally in the form of two back to back adjacent frusto-conical spaces (as shown in FIG. 7) is defined around each interconnecting element 108 and further annular spaces 134 generally in the form of two conical spaces pointing towards the spine 106 in nose to nose fashion (as shown in FIG. 7) are defined between adjacent rings 126.

As is to be appreciated, each interconnecting element 108, and an associated ring 126 when secured together by the locating members 130, form the modular unit 129 as shown in FIG. 7, which is connectable to an adjacent modular unit in end to end relationship. Thus, the airship 100 is made up of a plurality of interconnected and detachable modular units 129.

The elements 108 have an interior diameter sufficiently large for a serviceman to walk upright along the length of the spine 106 formed by the elements 108.

Further locating members 136 (only one of which is shown in FIG. 7) are connected between adjacent rings 126 zig-zag fashion. Thus, the airship 100 is divided into a plurality of compartments defined by the annular spaces 132 and 134 into which the gas bags 105 are receivable. The bags 105 are shaped to fit snugly in the compartments and may be secured to the frame assembly 109 and the spine 106 in any suitable manner, for example by material known as Velcro or by an extended seam portion, as is described above with reference to the airship 10. Typically, the gas bags 105 are filled with helium and are made from material sold under the tradename Tedlar or Ripstop and are coated with material sold under the tradename Hypelon as is described above.

Figure 8:
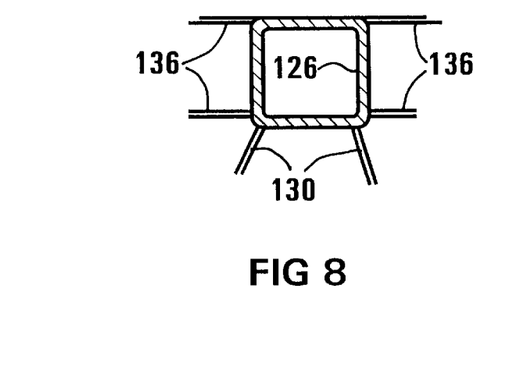
FIG. 8 represents a section taken along lines VIII—VIII in FIG. 7 showing a ring which forms part of the frame assembly.
Figure 9:
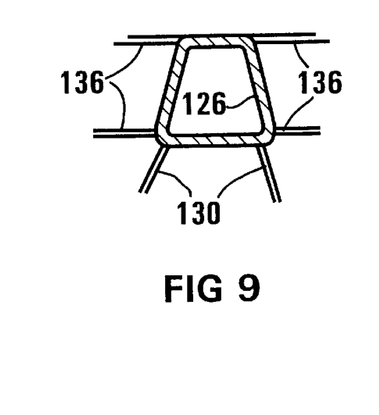
FIG. 9 shows a section similar to FIG. 8 of a modified form of the ring.

The rings 126 are in the form of hollow rolled aluminium tubes which may, for example, be rectangular or trapezoidal in cross-section as is shown in FIGS. 8 and 9 of the drawings, respectively. In a preferred embodiment of the invention, the rings 126 are rectangular in cross-section as is shown in FIG. 8 of the drawings.

The locating members 130 and 136 are generally in the form of flexible strands which are connected in tension between the rings 126 and the interconnecting elements 108 as is described in more detail below with reference to FIGS. 10 and 14. The locating members 130 and 136 may be made from any suitable strong flexible material such as that which is sold under the tradename Kevlar.

Figure 10:
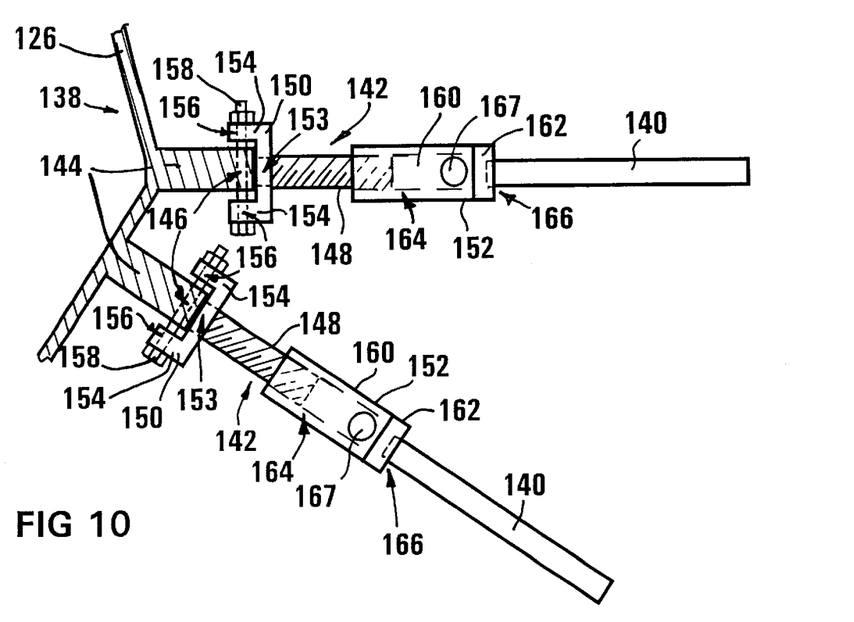
FIG. 10 represents a part of the ring in section to a larger scale showing attachment of part of the frame assembly to the ring in more detail.

Referring now to FIG. 10 of the drawings, reference numeral 138 represents a portion of one of the rings 126 shown in section and reference numeral 140 represents the upper ends of two Kevlar strands which are connected to the ring 126 by connecting arrangements which are generally indicated by reference numeral 142.

The ring 126 is provided with elongate connecting formations 144 which are integrally formed on the outer surface of the ring 126 and which extend outwardly therefrom. The connecting formations 144 define transversely extending apertures 146 towards their outer ends for connecting the connecting arrangements 142 to the ring 126 as is described in more detail below.

The connecting arrangements 142 each include a screw threaded shank component 148, a stirrup shaped clamp 150 and a ferrule-like component 152 which are typically made from a lightweight material such as titanium or aluminium. The shanks 148 are screw threadedly received within apertures 153 defined in a base of each clamp 150. Arms 154 of the clamps 150 are provided with transversely extending registering apertures 156 which are in register with the apertures 146. Bolt and nut arrangements 158 pass through the apertures 146 and 156 thereby pivotally securing the connecting arrangements 142 to the connecting formations 144.

Each of the ferrule-like components 152 is generally elongate and is in two sections 160 and 162. The sections 160 each define an internally screw threaded sleeve portion 164 which engages with the screw threaded shank 148. The sections 162 each have an opening or slot 166 into which ends of the Kevlar strands 140 are crimped (not shown in detail). The sections 160 further include transversely extending apertures 167 into which a torque bar (not shown) or the like is insertable. The section 160 is rotatable relative to the section 162, which is fixed against rotation, the section 160 thus being displaceable longitudinally relative to the shank 148.

Thus, in use, the connection arrangement 142 can be displaced longitudinally away from or towards the rings 126 by rotation of the section 160 relative to the section 162, via the torque bar, to adjust the tension of the Kevlar strands 140. Because the section 162 is fixed against rotation this prevents twisting of the Kevlar strands 140 on longitudinal displacement of the connecting arrangement 142.

The inner ends of the Kevlar strands 140 are connected to the interconnecting elements 108 as is described in more detail below with reference to FIG. 14 of the drawings.

Figure 14:
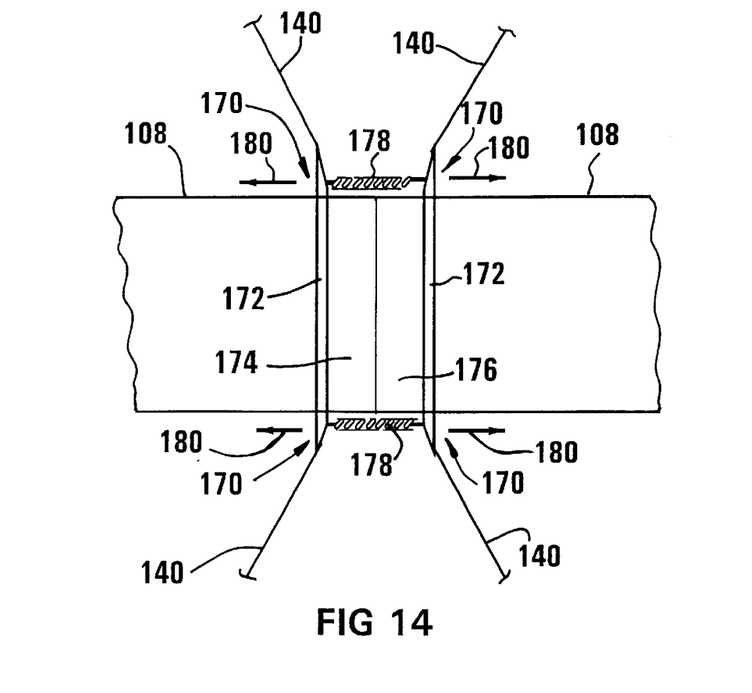
FIG. 14 represents a side view of part of the spine of the airship of FIG. 5 showing connection of the frame assembly to the spine with certain details again having being omitted for clarity.

Referring now to FIG. 14, two adjacent interconnecting elements 108 are provided with tension relaxing means generally represented by reference numeral 170. The purpose of the tension relaxing means 170 is to relax any over-tensioning of the Kevlar strands 140 which is induced by relative limited movement of the adjacent interconnecting elements 108 when the airship 100 is in flight.

The tension relaxing means 170 includes two inner rings 172 which are positioned around adjacent ends 174 and 176 of the adjacent interconnecting elements 108 and which are slidably moveable in a longitudinal direction over the interconnecting elements 108. The tension relaxing means 170 further includes two coil springs 178 which are connected between the rings 172 and which normally urge the rings 172 towards each other. The rings 172 are typically made of aluminium. The inner ends of the Kevlar strands 140 are secured to the rings 172 and are adjusted to a desired tension by the connecting arrangement 142 as is described above. The inner ends of the Kevlar strands 140 are secured to the rings 172 in the same manner as the upper ends are secured to rings 126 as is described above.

When the airship 100 is in flight the limited relative movement of the adjacent interconnecting elements 108 induces over-tensioning of the Kevlar strands 140. The over-tensioning is then taken up or relaxed by displacement of one or both of the rings 172 in the direction shown by arrows 180 and against the bias of the coil springs 178. Thus, the distance between ends of the Kevlar strands 140 is constantly maintained and, hence, the desired tension of the strands 140 is maintained. Once the tension is reduced, the rings 172 will be biassed back towards each other and the inner ends of the strands 140 will return to a normal position.

Figure 11:
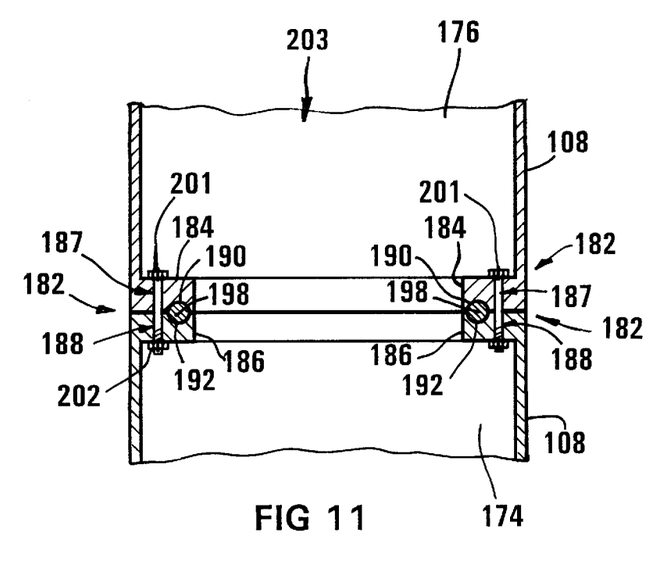
FIG. 11 represents a section taken along lines XI—XI of FIG. 5 showing connecting means of adjacent interconnecting elements of a spine of the airship.
Figure 12:
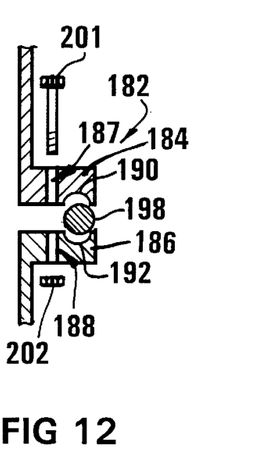
FIG. 12 represents an exploded view of part of the connecting means shown in FIG. 11.
Figure 13:
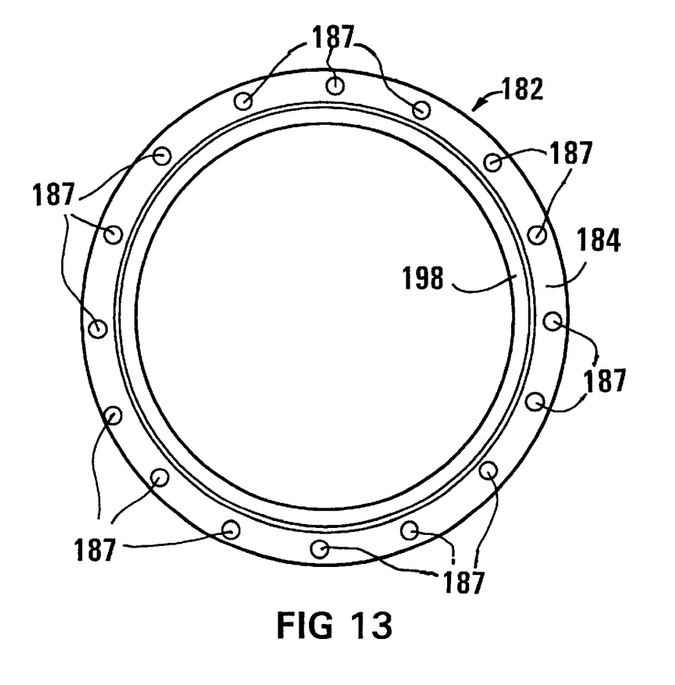
FIG. 13 represents a front view of a disc and a sealing ring which forms part of the connecting means shown in FIGS. 11 and 12 as would be seen from an end of one of the interconnecting elements.

Referring now to FIGS. 11, 12 and 13 of the drawings, the adjacent interconnecting elements 108 are generally circular in cross-section with each end thereof being provided with connecting means generally represented by reference numeral 182 for connecting each element 108 in end to end relationship. The interconnecting elements 108 are generally formed from a lightweight composite material such as a carbon fibre/expanded PVC/carbon fibre sandwich composite.

The connecting means 182 is in the form of adjacent inwardly protruding circular rims 184 and 186. The rim 184 defines a plurality of circumferentially spaced apertures 187 (only two of which are shown in FIG. 11) which are in register with a plurality of circumferentially spaced apertures 188 (only two of which are shown in FIG. 11) provided on the rim 186. FIG. 13 is an end view of one of the interconnecting elements 108 showing the rim 184 and the circumferentially spaced apertures 187. A sealing ring 198, typically a rubber sealing ring, is provided which fits between abutting faces of the rims 184, 186 into a space defined by annular recesses 190 and 192. The connection means 182 is further provided with bolts 201 (only two of which are shown in FIG. 11) which pass through the registering apertures 187, 188 and which are fastened by nuts 202 (only two of which are shown).

The adjacent interconnected elements 108 each define a passage 203 along their length thereby providing a conduit which extends along the length of the spine 106 for carrying instrumentation, fuel lines, and the like. The conduit may include sealing doors 127 positioned towards the outer extremities 116 and 118 which together with the sealing rings 198 make the conduit air tight. The conduit may be filled with compressed air and the direction of flight of the airship 100 may be controlled by releasing air from suitably directed ports (not shown). The spine 106 provides a continuous vessel sealed at both ends, in flight, for providing ballast and low speed manoeuvrability.

In FIGS. 15, 16, 17 and 18 of the drawings, reference numeral 101 general represents the gondola of the airship 100 which is positioned within the lower half of the annular space 102 as is shown in FIG. 5 of the drawings.

The gondola 101 is generally shaped to fit within the lower half of the annular space 102 between adjacent rings 126 such that an outwardly facing surface thereof 302 is flush with the outer surface of the airship 100. Accordingly, the outwardly facing surface 302 is generally semi-circular in outline as would be seen from both sides 306 and 307 and as can best be seen in FIG. 15.

Figure 16:
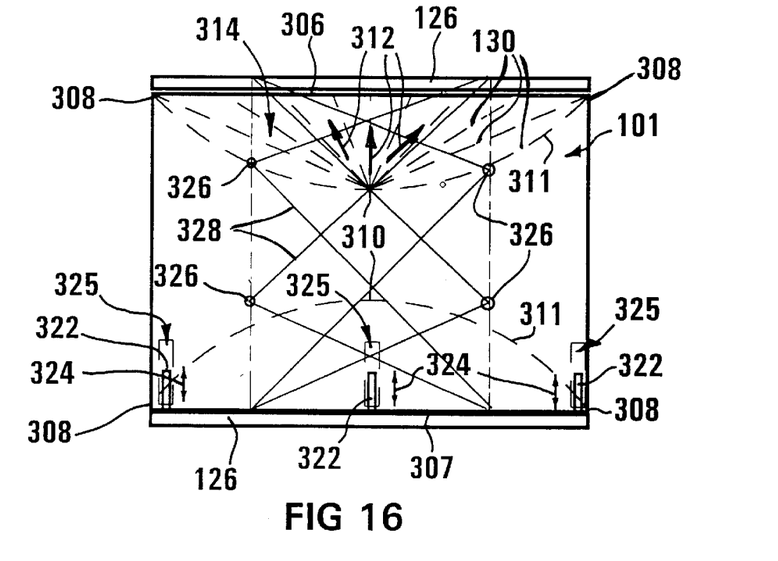
FIG. 16 represents a schematic top view of a module of the airship of FIG. 15 into which the gondola fits.

In order to fit snugly within the lower half of the annular space 102 the upper edges of the sides 306 are inwardly tapered from each upper corner 308 to a central position 310 as would be seen in plan and is shown schematically by the dotted lines labelled with reference numeral 311 in FIG. 16. This is necessary to enable the gondola 101 to be clear of the locating members 130 (shown schematically only on one side of the airship 100 in FIGS. 16 and 17).

Figure 17:
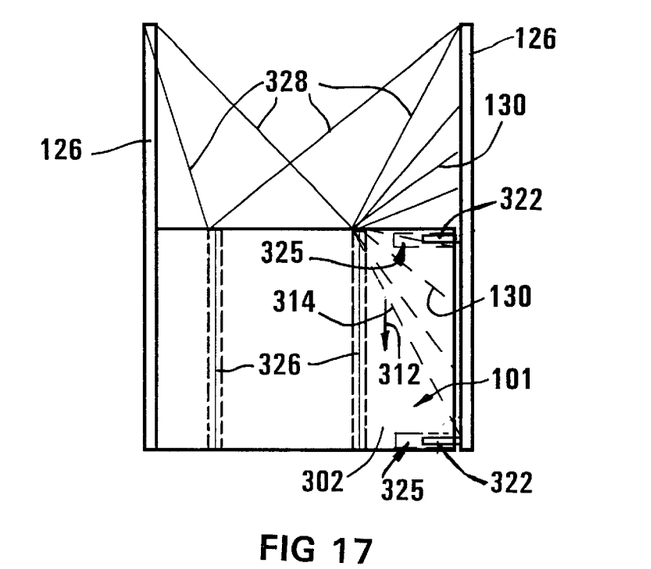
FIG. 17 represents a schematic side view of the module of FIG. 16.

As it is to be appreciated, the degree of tapering reduces progressively along the sides 306 and 307 in a direction shown by arrow 312 so that the side surfaces 314 (only shown on one side) are generally profiled to fit around the locating members 130.

Figure 18:
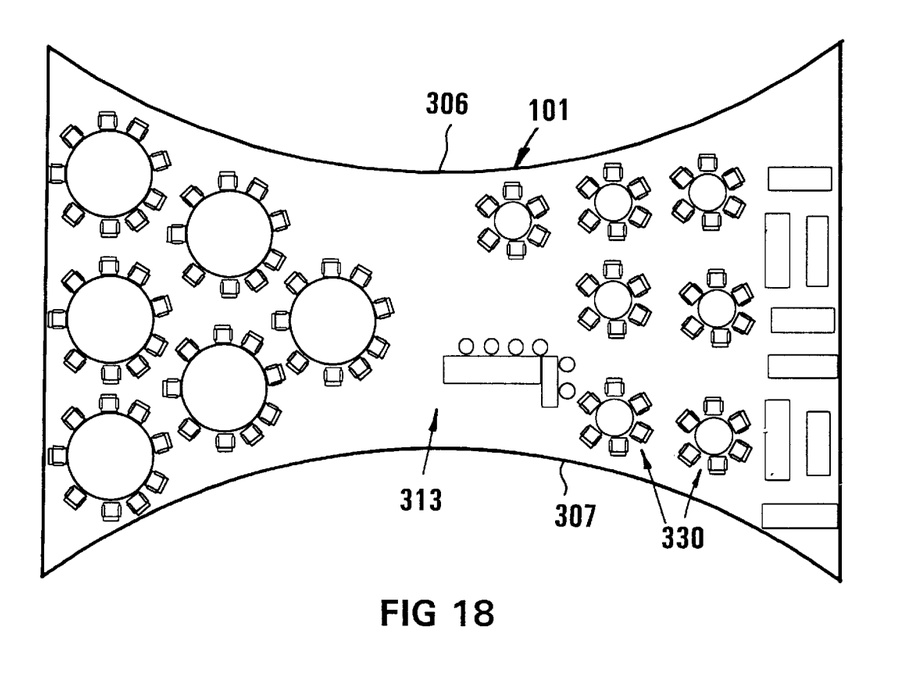
FIG. 18 represents a section taking along lines XVIII—XVIII of FIG. 15 showing one of the decks of the gondola unit.

The gondola 101 will typically include a number of decks. FIG. 18 shows a section taken above one of the decks of the gondola 101 showing the curvature of the sides 306 and 307 which define a neck portion 313. As indicated, the degree of curvature or tapering is less pronounced as would be seen in a series of sections taken in plan along the direction of arrow 312 so that the neck portion becomes progressively wider in plan along the direction of arrow 312. The general arrangement of furniture and the like is schematically shown by reference numeral 330 in FIG. 18 and is not described in detail.

Figure 15:
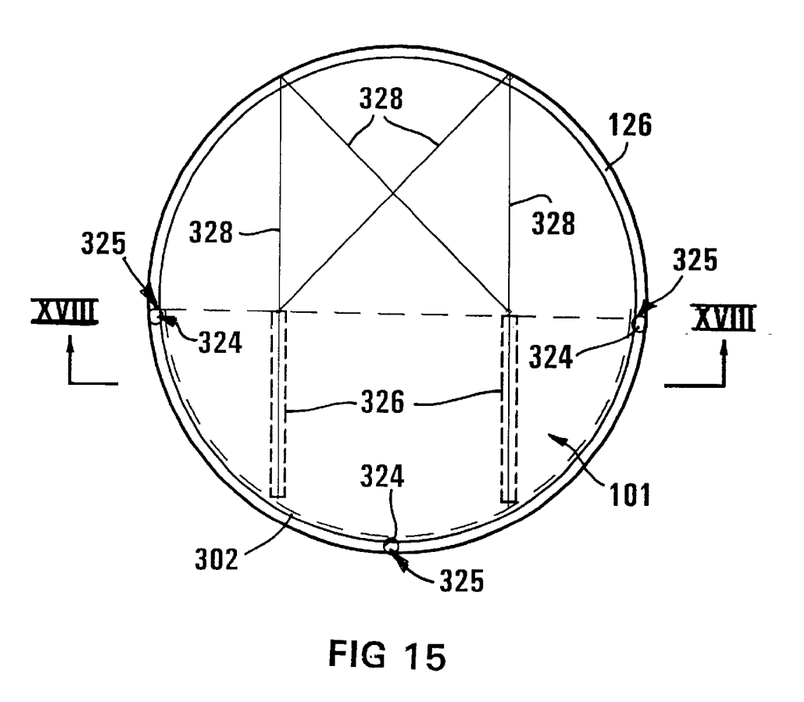
FIG. 15 represents a schematic sectional end view of the airship taken along lines XV—XV of FIG. 5 showing attachment of a gondola to the airship.

The two adjacent rings 126 between which the gondola 101 fits are provided with three circumferentially spaced mountings 322 which are capable of extending or retracting telescopically in directions shown by arrows 324. The gondola 101 is provided with attachment means in the form of three horizontally extending elongate slots 325 which are in register with the mountings 322 and which are positioned at spaced intervals around a peripheral region of the semi circular surface 302 of the gondola 101.

The gondola 101 is further provided with four suspension shafts or rods 326 which extend parallel to the plane of the rings 126. A plurality of suspension cables 328 extend between the rings 126 and the suspension shafts 326. When the gondola 101 is placed within the annular space 102 it is located in position by engagement of the mountings 322 with the elongate slots 324 and is supported in position by the suspension cables 328.

At least a portion of the outer face 302 adjacent the decks is made from a transparent material, for example, material sold under the tradename Perspex, to allow viewing from the gondola 101. The remainder of the elongate support structure 104 is provided with an outer skin 63 or envelope (as shown in part in FIG. 5) which provides a continuous outer surface for placing advertisements and the like on the airship 100. Typically, the outer skin 63 is made from a multilayered laminate of Tedlar/Ripstop and polyester as is described above with reference to the airship 10.

In another embodiment, the locating members 130 may be absent on opposed facing sides of two adjacent rings 126 such that the annular space 102 extends between adjacent rings 126. The gondola 101 would then be half circular cylindrical in shape to fully occupy the lower half of the space 102 between the rings 126 and would be square or rectangular as seen in plan having straight sides 306 and 307.

The airship 100 is typically formed from thirteen modular units 129 and has an overall length of about one hundred and thirty meters and a passenger carrying capacity of about sixty passengers. It is also capable of achieving speeds of up to one hundred knots. The gondola 101 is also fitted with sleeping facilities, ablution facilities, leisure facilities and the like, thereby making it suitable for relatively long journeys. As is to be appreciated, the airship 100 may be smaller in size for use in game viewing and the like, for example, the airship 100 may have a diameter of 75 meters and a length of 19.5 m. The airship 100 may also be larger in size having a diameter of up to 164 m and a length of up to 800 m.

The Applicant believes that the modular nature of the airship 10, 100 as illustrated provides for convenient and easy detachment of one or more of the modular units 28, 129 thereby allowing quick and easy expansion of the length of the airship 10, 100. The passenger and crew carrying capacity of the airship 10, 100 can thus be selected at will and expanded and contracted as required. Replacement units may also be readily fitted. The Applicant further believes that the airship 10, 100 provides a lightweight and strong support structure, which due to the fact that each modular unit contains a plurality of bags is able to sustain itself in the air should, for example, only one of the bags burst. The modular nature of the airship 10, 100 also allows the fitment of engines or motors intermediate the modular units 28, 129.

The Applicant further believes that due to the manner in which the interconnecting elements 108 are connected and the manner in which the tension relaxing means 170 operates the airship 100, while being provided with a generally strong overall support structure 104, exhibits a certain amount of inherent elasticity which provides inertial relief in flight, whereby the airship 100 is capable of absorbing externally applied forces and thereafter returning to its original shape. The possibility of catastrophic failure or collapse on collision is also substantially reduced which is not the case with rigid inelastic airships of which the Applicant is aware.

Applicant believes that the central spine 37, 106 also provides overall rigidity to the airship 100 and at the same time a certain amount of flexibility.

I claim:

1. A modular unit for forming an airship, the modular unit including an elongate spine intended to extend along a longitudinal axis of the airship, the spine including at least one interconnecting element having connection means for joining it in end to end relationship with an interconnecting element of an adjacent modular unit;

buoyant support means fixed relative to the spine for providing buoyant support to the airship, in flight;

a frame assembly including at least one support ring which is positioned in radially spaced relationship relative to the spine intermediate leading and trailing extremities of the spine thereby defining an annular space between the spine and the ring;

a plurality of elongate locating members which are fixed at circumferentially spaced positions to the ring and which extend inwardly from the ring towards the spine, in tension, so as to define a pair of back to back frusto-conical spaces, the locating members serving to position the ring relative to the spine; and, a pair of spaced inner rings located in close proximity to the spine at leading and trailing extremities thereof with the locating members being fixed thereto and wherein the inner rings are slidable longitudinally relative to the spine and are connectable by means of biassing springs to similar inner rings of an adjacent modular unit thereby to bias the inner rings in opposite directions to form tension relaxing means.

2. A unit as claimed in claim 1, in which the buoyant support means is in the form of at least one gas bag received within the frame assembly for supporting the bag around the spine.

3. A unit as claimed in claim 1, in which the locating members extend bicycle-spoke fashion between the ring and the leading and trailing extremities of the spine.

4. A unit as claimed in claim 1, in which the locating members are in the form of flexible strands.

5. A unit as claimed in claim 1, in which the spine defines an inner longitudinally extending passage which extends along the length of the spine.

6. An airship which includes a central spine extending along a longitudinal axis of the airship for providing rigidity to the airship; a frame assembly attached to and surrounding the spine; and buoyant support means fixed relative to the spine for providing buoyant support to the airship, in flight, the airship being formed from a plurality of modular units as claimed in claim 1.

7. An airship as claimed in claim 6, which includes a gondola having releasable attachment means for releasably attaching the gondola to the airship.

8. An airship as claimed in claim 7, in which the gondola is received within at least a portion of an annular space defined around the spine, the gondola having an arcuately shaped outer surface which is flush with an outer surface of the airship.

9. An airship as claimed in claim 6, which includes a flexible outer skin which at least partially surrounds the modular units.

* * * * *